United States Patent
Tucker

(10) Patent No.: US 11,755,621 B2
(45) Date of Patent: Sep. 12, 2023

(54) SYSTEMS AND METHODS FOR ATOMIC PUBLICATION OF DISTRIBUTED WRITES TO A DISTRIBUTED DATA WAREHOUSE

(71) Applicant: Argo AI, LLC, Pittsburgh, PA (US)

(72) Inventor: Benson Tucker, Pittsburgh, PA (US)

(73) Assignee: ARGO AI, LLC, Pittsburgh, PA (US)

(*) Notice: Subject to any disclaimer, the term of this patent is extended or adjusted under 35 U.S.C. 154(b) by 74 days.

(21) Appl. No.: 17/315,460

(22) Filed: May 10, 2021

(65) Prior Publication Data
US 2022/0358144 A1 Nov. 10, 2022

(51) Int. Cl.
*G06F 16/28* (2019.01)
*G06F 16/2455* (2019.01)
*G06F 16/27* (2019.01)
*G06F 16/21* (2019.01)

(52) U.S. Cl.
CPC .......... *G06F 16/283* (2019.01); *G06F 16/219* (2019.01); *G06F 16/2455* (2019.01); *G06F 16/27* (2019.01)

(58) Field of Classification Search
None
See application file for complete search history.

(56) References Cited

U.S. PATENT DOCUMENTS

| 8,909,415 | B1* | 12/2014 | Hawley | H04W 4/38 |
| | | | | 701/32.3 |
| 9,542,406 | B1 | 1/2017 | Bourbonnais et al. | |
| 10,659,335 | B1* | 5/2020 | Morris | H04L 43/50 |
| 2003/0120593 | A1 | 6/2003 | Bansal et al. | |
| 2006/0117057 | A1* | 6/2006 | Legault | G06F 16/283 |
| | | | | 707/999.102 |
| 2006/0294300 | A1 | 12/2006 | Lubbers | |
| 2009/0187344 | A1 | 7/2009 | Brancaccio et al. | |
| 2010/0280991 | A1 | 11/2010 | Chen et al. | |
| 2013/0179482 | A1* | 7/2013 | Becker | G06F 16/13 |
| | | | | 707/830 |
| 2013/0239036 | A1 | 9/2013 | MacDonald | |
| 2013/0268567 | A1 | 10/2013 | Adjei-Banin et al. | |
| 2014/0258351 | A1 | 9/2014 | Laron | |

(Continued)

OTHER PUBLICATIONS

"Database Data Warehousing Guide: Introduction to Data Warehousing Concepts," https://docs.oracle.com/database/121/DWHSG/concept.htm, Dec. 30, 2020.

(Continued)

*Primary Examiner* — Christopher J Raab
(74) *Attorney, Agent, or Firm* — FOX ROTHSCHILD, LLP

(57) ABSTRACT

Systems and methods for retrieving and using data stored in a data warehouse. The methods comprise performing the following operations by a computing device: receiving a query for information directed to a plurality of fact tables (each fact table comprising sets of source data that are arranged so as to be respectively associated with a plurality of first publication identifiers); obtaining second publication identifiers from a publication table, in response to the query; and obtaining at least one of the sets of source data from each fact table that is associated with a first publication identifier of the plurality of first publication identifiers which matches one of the second publication identifiers.

19 Claims, 7 Drawing Sheets

(56) References Cited

U.S. PATENT DOCUMENTS

| | | | |
|---|---|---|---|
| 2016/0026692 | A1 | 1/2016 | Cannaliato et al. |
| 2016/0132828 | A1 | 5/2016 | Hartung et al. |
| 2016/0232204 | A1 | 8/2016 | Zholudev et al. |
| 2016/0359872 | A1* | 12/2016 | Yadav .................... H04L 63/20 |
| 2017/0024435 | A1* | 1/2017 | Kociubes ............ G06F 16/2453 |
| 2017/0075972 | A1 | 3/2017 | Fox et al. |
| 2017/0300552 | A1 | 10/2017 | Mandadi et al. |
| 2018/0046661 | A1 | 2/2018 | Atkins |
| 2018/0060132 | A1 | 3/2018 | Maru et al. |
| 2018/0082449 | A1* | 3/2018 | Poduri .................. H04L 43/045 |
| 2018/0239828 | A1 | 8/2018 | Lublinsky et al. |
| 2018/0276304 | A1 | 9/2018 | Peled et al. |
| 2018/0349229 | A1 | 12/2018 | McGrath |
| 2019/0129712 | A1* | 5/2019 | Hawrylo .................. G06F 8/20 |
| 2020/0233600 | A1 | 7/2020 | Swamy et al. |
| 2020/0242129 | A1 | 7/2020 | Botev et al. |
| 2020/0334125 | A1 | 10/2020 | Degaonkar et al. |
| 2021/0208905 | A1* | 7/2021 | Jayanthi .............. G06F 9/44526 |
| 2021/0342322 | A1* | 11/2021 | Rielau .................. G06F 16/219 |
| 2022/0050921 | A1 | 2/2022 | LaFever et al. |
| 2022/0058163 | A1 | 2/2022 | Fink et al. |
| 2022/0121673 | A1 | 4/2022 | Paraschiv et al. |

OTHER PUBLICATIONS

"Uploads and Downloads," https://cloud.google.com/storage/docs/uploads-downloads, Dec. 30, 2020.

"Data Warehouse Concepts: What is a Data Warehouse?," https://aws.amazon.com/data-warehouse/, Dec. 30, 2020.

Turki et al., "Multiversion data warehouse constraints" DO LAP '10: Proceedings of the ACM 13th international workshop on Data warehousing and OLAP Oct. 2010, pp. 11-18https://doi.org/10.1145/1871940.1871945 (Year: 2010).

U.S. Appl. No. 17/315,451, filed May 10, 2021, Systems and Methods for Atomic Publication of Distributed Writes to a Distributed Data Warehouse.

U.S. Appl. No. 17/315,457, filed May 10, 2021, Systems and Methods for Atomic Publication of Distributed Writes to a Distributed Data Warehouse.

Wouter Swierstra,Andres Loh, The Semantics of Version Control, Onward! 2014: Proceedings of the 2014 ACM International Symposium on New Ideas, New Paradigms, and Reflections on Programming & SoftwareOct. 2014, pp. 43-54https://doi.org/ 10.1145/2661136.2661137 (Year: 2014).

* cited by examiner

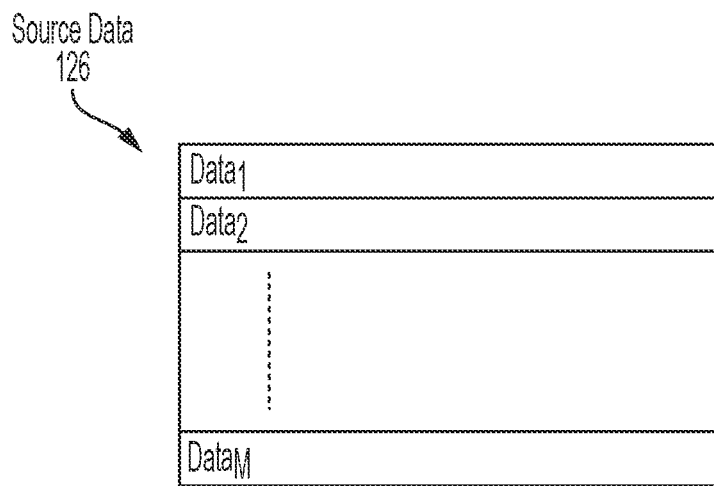

SYSTEMS AND METHODS FOR ATOMIC PUBLICATION OF DISTRIBUTED WRITES TO A DISTRIBUTED DATA WAREHOUSE

BACKGROUND

Statement of the Technical Field

The present disclosure relates generally to computing devices. More particularly, the present disclosure relates to implementing systems and methods for atomic publication of distributed writes to a distributed data warehouse.

Description of the Related Art

Maintaining data integrity in the context of client and server failures is a major focus of database systems. Data warehouses have been used for reporting and data analysis in enterprises. Data warehouses are considered a core component to business intelligence. Data warehouses are data storage facilities that are central repositories that store data received from one or more sources. The data warehouses carried forward the strategies from transactional databases, using Multi-Version Concurrency Control (MVCC) transaction isolation to allow clients to mutate data in a private copy, and then commit their transaction to make their copy authoritative.

As these warehousing systems have scaled, they have typically added worker pools to provide massively-parallel processing, while retaining a master node to facilitate transactions. Because concurrent transactions can read and write potentially overlapping data, master nodes must implement locking and serialization on the tables and records of the database at some central point to ensure data integrity.

Alongside this movement towards parallelism, data warehousing systems have offered interfaces allowing clients to trade database-managed transactional guarantees for higher performance. These bulk load or extract methods typically guarantee some atomicity for a given request to add or remove data, but do not allow composition into larger transactions, e.g., mutations of multiple tables. This poses a problem for users who wish to expose large amounts of data with high performance and atomicity over a composition of bulk operations.

SUMMARY

The present disclosure concerns implementing systems and methods for managing data. The methods comprise: receiving, by a load driver node of a network, a request for upload of source data associated with a resource name to a data warehouse; generating a publication identifier and a version value (e.g., a last modified time of the source data) for the source data by the load driver node in response to the request; causing, by the load driver node, operations to be performed by load worker nodes to facilitate population of at least one fact table of the data warehouse with the publication identifier and the source data; and causing, by the load driver node, the publication table to be updated to include the publication identifier and the version value so as to be associated with the resource name. The load driver node and the load worker nodes are external to the data warehouse and/or reside in a user domain of the network. The data warehouse performs multi-version currency control operations to facilitate upload of the source data, and resides in a warehouse domain of the network.

In some scenarios, the publication identifier is generated by: obtaining a one-time-use value (e.g., via a pseudo-random, random or chaotic algorithm); and setting the publication identifier equal to the one-time-use value. Additionally or alternatively, the methods also comprise: determining, by the load driver node, whether the operations of the load worker nodes were successful; deciding that a load failure occurred when a determination is made that the operations of the load workers were not successful; determining, by the load driver, whether the version value is greater than a current version value in a publication table of the data warehouse; discarding the publication identifier and the version value when a determination is made that the version value is not greater than the current version value; and/or updating the publication table with the publication identifier and the version value when a determination is made that the version value is greater than the current version value.

Additionally or alternatively, the methods comprises causing the source data or results from an analysis of the source data to be used to control operations of an autonomous vehicle. In this regard, the source data is made accessible to computing device in a user domain of the network such that the source data can be retrieved, analyzed and/or used to control operations of a vehicle (e.g., an autonomous vehicle). For example, the source data can be analyzed to determine whether a new or updated high definition map and/or software for controlling an autonomous vehicle has a given level of quality or safety (e.g., based on a number of and/or type of faults experienced during simulation of vehicle operations using the control software). If so, then the high definition map and/or control software is deployed in the autonomous vehicle. The high definition map and/or control software may be used to control autonomous driving operations such as object detection, object classification, object trajectory generation, and vehicle trajectory generation.

Those or other methods for managing data can comprise performing the following operations by a computing system: generating publication identifiers (e.g., at least one comprising a one-time-use value) and version values (e.g., at least one comprising a last modified time of respective source data) for source data to be stored into a data warehouse; causing a plurality of fact tables in the data warehouse to be populated with the source data and the publication identifiers; causing a publication table in the data warehouse to be updated to include the publication identifiers and the version values so as to be respectively associated with resource names; receiving a query for information directed to the plurality of fact tables; retrieving the publication identifiers from the publication table, in response to the query; and obtaining source data from each fact table that is associated with publication identifiers that are stored in both the fact table and the publication table. Each fact table may comprise sets of source data that are arranged so as to be respectively associated with the publication identifiers.

In some scenarios, the methods also comprise: performing a computation as per the query using the source data obtained from each fact table; generating a query result comprising at least one of (i) the source data obtained from each fact table and (ii) a computation result; performing an assessment of data or software using the query result; updating the given data or software to address issues identified during the assessment; and using the given data or software to control an autonomous or semi-autonomous vehicle based on results of assessment (e.g., to control autonomous driving operations such as object detection, object classification, object trajectory generation, vehicle trajectory generation, etc.). Additionally or alternatively, operations are performed to determine whether each of the version values is greater than a current version value in the publication table. The publication table is updated with ones of the version values that are respectively determined to be greater than the current values in the publication table.

The present document also relates to methods for retrieving and using data stored in a data warehouse. These methods comprise performing the following operations by a computing device (e.g., a server of a data warehouse): receiving a query for information directed to a plurality of fact tables (each fact table comprising sets of source data that are arranged so as to be respectively associated with a plurality of first publication identifiers); obtaining second publication identifiers from a publication table, in response to the query; and obtaining at least one of the sets of source data from each fact table that is associated with a first publication identifier of the plurality of first publication identifiers which matches one of the second publication identifiers.

In some scenarios, the methods also comprise: performing a computation as per the query using the source data; communicating, to an external device from which the query was received, a query result comprising (i) the sets of source data obtained from the fact tables and/or (ii) results from processing the sets of source data obtained from the fact tables; performing (e.g., by the external device or another external device) an assessment of given data or software using the query result; updating the given data or software to address issues identified during the assessment; and/or using the given data or software to control an autonomous or semi-autonomous vehicle based on results of assessment.

Additionally or alternatively, the methods comprise: updating the publication table to include the second publication identifiers and version values so as to be associated with a resource name (each version value indicating a version of respective source data and may comprise a last modified time of the respective source data). The publication table can be updated to include a given version value (and corresponding second publication identifier) when a determination is made that the given version value is greater than a current version value for the respective source data that is stored in the publication table.

Implementing systems of the above-described methods for managing, retrieving and/or using data and can include, but are not limited to, a processor and a non-transitory computer-readable storage medium comprising programming instructions that are configured to cause the processor to implement a method for managing data.

BRIEF DESCRIPTION OF THE DRAWINGS

The present solution will be described with reference to the following drawing figures, in which like numerals represent like items throughout the figures.

FIG. 3 provides an illustration of source data.

FIG. 4 provides an illustration of a fact table.

FIG. 5 provides an illustration of a publication table.

DETAILED DESCRIPTION

Figure 1:
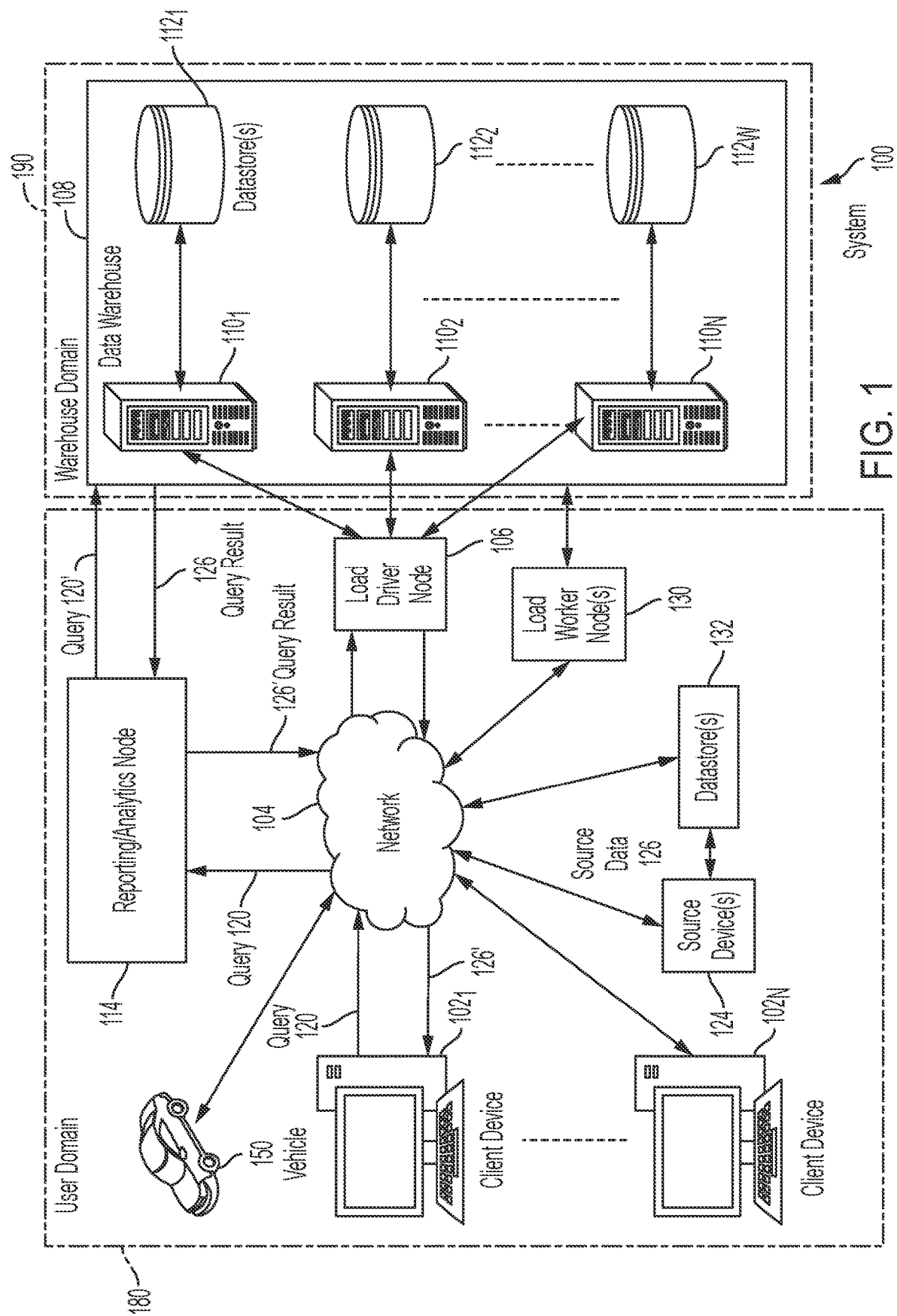
FIG. 1 provides an illustration of a system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

As noted above, data warehousing systems have offered interfaces allowing clients to trade database-managed transactional guarantees for higher performance. These bulk load or extract methods typically guarantee some atomicity for a given request to add or remove data, but do not allow composition into larger transactions, e.g., mutations of multiple tables. This poses a problem for users who wish to expose large amounts of data with high performance and atomicity over a composition of bulk operations. That is: how can the results of a collection of bulk mutations that bypass transactional semantics be nonetheless exposed to query users instantaneously upon fully-successful completion, and hidden otherwise?

The present solution provides a means to address this drawback of conventional distributed data warehouse systems. The present solution generally moves the traditional responsibilities for large fact tables into user space/domain, allowing a computing device external to the data warehouse to perform some operations normally reserved for the internals of a master node of the data warehouse.

In this regard, the present solution concerns implementing systems and methods for managing data. The methods generally comprise: receiving, by a load driver node of a network, a request for upload of source data associated with a resource name to a data warehouse; generating a publication identifier and a version value (e.g., a last modified time of the source data) for the source data by the load driver node in response to the request; causing, by the load driver node, operations to be performed by load worker nodes to facilitate population of at least one fact table of the data warehouse with the publication identifier and the source data; and causing, by the load driver node, the publication table to be updated to include the publication identifier and the version value so as to be associated with the resource name. The load driver node and the load worker nodes are external to the data warehouse and/or reside in a user domain. The data warehouse performs multi-version currency control operations to facilitate upload of the source data.

In some scenarios, the publication identifier is generated by: obtaining a one-time-use value (e.g., via a pseudo-random, random or chaotic algorithm); and setting the publication identifier equal to the one-time-use value. Additionally or alternatively, the methods also comprise: determining, by the load driver node, whether the operations of the load worker nodes were successful; deciding that a load failure occurred when a determination is made that the operations of the load workers were not successful; determining, by the load driver, whether the version value is greater than a current version value in a publication table of the data warehouse, when a determination is made that the operations of the load worker nodes were successful; discarding the publication identifier and the version value when a determination is made that the version value is not greater than the current version value; and/or updating the publication table with the publication identifier and the version value when a determination is made that the version value is greater than the current version value.

Those or other methods of the present solution can comprise performing the following operations by a computing system: generating publication identifiers and version values for source data to be stored into a data warehouse; causing a plurality of fact tables in the data warehouse to be populated with the source data and the publication identifiers; causing a publication table in the data warehouse to be updated to include the publication identifiers and the version values so as to be respectively associated with resource names; receiving a query for information directed to the plurality of fact tables; retrieving the publication identifiers from the publication table, in response to the query; and obtaining source data from each fact table that is associated with publication identifiers that are stored in both the fact table and the publication table.

In some scenarios, the computing system may also: perform a computation as per the query using the source data obtained from each fact table; generate a query result comprising at least one of (i) the source data obtained from each fact table and (ii) computation results(s); perform an assessment of data or software using the query result; and/or use the given data or software to control an autonomous or semi-autonomous vehicle based on results of assessment (e.g., to control autonomous driving operations such as object detection, object classification, object trajectory generation, vehicle trajectory generation, etc.).

The present document also relates to methods for retrieving and using data stored in a data warehouse. These methods comprise performing the following operations by a computing device (e.g., a server is the data warehouse): receiving a query for information directed to a plurality of fact tables (each fact table comprising sets of source data that are arranged so as to be respectively associated with first publication identifiers); obtaining second publication identifiers from a publication table, in response to the query; and obtaining at least one of the sets of source data from each fact table that is associated with a first publication identifier which matches one of the second publication identifiers.

In some scenarios, the computing device may also: perform a computation as per the query using the source data; and communicate, to an external device from which the query was received, a query result comprising at least one of (i) the sets of source data obtained from the fact tables or (ii) results from processing the sets of source data obtained from the fact tables. The external device or another external device may perform an assessment of given data or software using the query result. The given data or software may be updated to address issues identified during the assessment. Additionally or alternatively, the given data or software is used to control an autonomous or semi-autonomous vehicle based on results of assessment.

Implementing systems of the above-described methods for managing, retrieving and/or using data and can include, but is not limited to, a processor; and a non-transitory computer-readable storage medium comprising programming instructions that are configured to cause the processor to implement a method for managing data.

Previous solutions typically compromise on atomicity or efficiency. Solutions compromising efficiency typically load data twice. Bulk load operations that cannot be composed in a transaction target temporary 'staging' tables known only to a particular client device. This client device will then issue MERGE statements for the underlying data records to move them from the staging tables to user-facing tables. Thus, new data exists in at least two copies in the data warehouse, and the MERGE statement typically exercises a more resource intensive predicate (verifying the uniqueness/precedence of each fact record, instead of a single publication record, as in the present solution).

Solutions compromising atomicity typically target user-facing tables directly, but end up exposing the new records for different fact tables at different times. One such approach involves implementing data source locks/leases among distributed writer applications. In this strategy, the state of a source data element is tracked in some application datastores, and a task that will load it will lease a claim on this element and record its success after the operation on the fact table completes. This poses separate management problems around lock expiry and bulk changes that are mutations of existing facts (rather than inserts of new facts).

The present solution chooses trade-offs that pose a potential penalty in read-time and storage requirements. Because a join to the publications table is required for all reads, there is an additional task for all queries. However, this is a trivial cost at scale, as the publications records number in thousands, while the fact records number in billions. Data warehouse query planners recognize that the authoritative publication identifiers can be quickly read from the small table and distributed to the parallel workers that scan the fact tables. Empirically, it is observed that this work takes less than 1% of the time that each operation on fact tables takes, even when those fact tables are finely partitioned and operations involve only millions, and not billions, of rows.

Additionally, while in a transactional system, uncommitted data of failed transactions can be garbage collected by the system, in the present solution this task falls to the client device. However, in practice, the share of records from failed writes is very small, representing around a 1% penalty to storage requirements if no garbage collection is implemented.

Referring now to FIG. 1, there is provided an illustration of an illustrative system 100 implementing the present solution. System 100 comprises source devices 124 that generate source data 126 and store the same in datastore(s) 132. In some scenarios, the source data is generated during simulation operations performed by a source device 124 to simulate operations of a vehicle 150 using an updated version of vehicle software. Vehicle 150 can include, but is not limited to, an autonomous vehicle and a semi-autonomous vehicle. Vehicle 150 is not limited to automobiles and/or trucks. Vehicle can also be an aircraft, a water craft or a space craft. The present solution is not limited to the particulars of these scenarios. An illustration of source data 126 is provided in FIG. 3. Source data 126 comprises data parts $Data_1, Data_2, \ldots, Data_M$. M is an integer.

Each source device 124 can request that the respective source data 126 be uploaded to a data warehouse 108. The present solution is not limited in this regard. For example, in some scenarios, the request to load source data would come from an orchestration system that is causing the source devices to compute or otherwise generate the source data. In the simulation case, a simulation supervisor node causes many source devices to generate and store data. Thereafter, the simulation supervisor node then requests that the data be loaded to a data warehouse.

The request is sent from the source device 124 to a load driver node 106 via network 104 (e.g., the Internet and/or an Intranet). In response to the request, the load driver node 106 and load worker nodes 130 perform operations to cause the source data 126 to be stored in the data warehouse 108. As used in this document, a "node" is a computing device that receives data via a network and transfers the data to another system or services, and which may process the data before transferring it. A "load driver node" comprises hardware and/or software configured to coordinate storage of source data in a data warehouse and/or facilitate retrieval of the source data from the data warehouse. The load driver node is a master node that assigns work to the load worker nodes. A "load worker node" comprises a computing device that acts as a slave node to the load driver node and performs the assigned tasks. The load worker nodes process data and may report task statuses to the load driver node. Nodes 106 and 130 can collectively comprise a single computing device, or comprise separate and distinct computing devices. The particulars of these operations will become evident as the discussion progresses. The data warehouse 108 comprises servers $110_1, 110_2, \ldots, 110_N$ (collectively referred to as 110) and datastore(s) $112_1, 112_2, \ldots, 112_W$ (collectively referred to as 112). The servers 110 are configured to facilitate the storage of source data 126 in datastore(s) 112.

The source data 126 is stored in one or more fact tables of the data warehouse. In some scenarios, the source data 126 can include, but is not limited to, results from simulating operations of a vehicles using a high definition map (e.g., a road/terrain map) and vehicle software. Techniques for simulating vehicle operations are well known. The simulation results can include, but are not limited to, velocity values, acceleration values, steering angles, braking particulars, throttling particulars, paths of travel, vehicle locations/positions/orientations, vehicle faults/errors, vehicle collisions, cautious maneuvers, and/or emergency maneuvers.

Such vehicle simulations techniques are described in U.S. patent Ser. No. 17/178,333 filed on Feb. 18, 2021. The contents of this application are incorporated herein by reference in its entirety. This document described systems and methods for identifying corner case simulation scenarios for an autonomous vehicle. The system includes a data store containing various scenes. Each scene includes perception data corresponding to one or more actors as perceived over a time window by an autonomous vehicle perception system during a run of an autonomous vehicle during a time window in a real-world environment. Computing elements of the system will select, from the data store, a scene that includes a safety threshold violation. The system will identify, in the selected scene, a first actor that was a participant in the safety threshold violation. The system will identify a trajectory of the first actor over at least a portion of the time window of the actor's run. The system will generate a set of simulated scenes by generating simulated trajectories of the first actor in the selected scene. The system will then input one or more of the simulated scenes into an autonomous vehicle motion planning model to train an autonomous vehicle motion planning model. The present solution is not limited to the above-described technique for simulating vehicle operations.

For example, other vehicle simulation systems and methods are described in U.S. patent Ser. No. 17/236,000, the content of which is incorporated herein by reference. These systems and methods are generally configured to simulate operations of autonomous vehicles, use the simulation results to assess the quality of a high definition map, deploy the high definition map in autonomous vehicles, and use the deployed high definition map to control operations of the autonomous vehicles. More specifically, the methods comprise performing the following operations by a computing device (e.g., an on-board computing device of the vehicle or a computing device remote from the vehicle (e.g., a server)): generating a plurality of simulation routes for a vehicle to traverse in a map; simulating operations of the vehicle along each route of the plurality of simulation routes in the map; analyzing results from the simulating to determine whether or not a quality of the map is validated; causing the map to be used to control autonomous or semi-autonomous operations of the vehicle, when a determination is made that the quality of the map is validated; and performing a given operation other than said causing, when a determination is made that the quality of the map is not validated. The map may be considered to be of a good quality, an acceptable quality, a satisfactory quality and/or a validated quality when, for example, the vehicle traversed all the lane(s) that were tested without experiencing any faults of given types or a minimal number of faults of the given type (e.g., less than X minor issues occur, where X is a threshold value determined based on historical data, and zero major or critical issues occur) and/or without having to perform a dangerous and/or emergency maneuver. The map is considered to be of a bad quality, an unacceptable quality, an unsatisfactory quality and/or invalidated quality when, for example, the vehicle was unable to traverse at least one of the lane(s) that were tested, experienced one or more faults of given types (e.g., more than or equal to X minor issues occur, where X is a threshold value determined based on historical data, and/or if any major or critical issues occur), and/or performed one or more emergency operations (e.g., swerved, took a sharp turn into traffic, and/or performed an emergency maneuver to avoid an obstacle). Such systems and methods can be used here.

An illustration of a fact table 402 is provided in FIG. 4. A separate fact table is created for each fact type (e.g., a velocity fact table including velocity values, an acceleration fact table including acceleration values, etc.). The respective source data is stored in each table so as to be associated with publication identifier(s) $PID_{1-1}$, $PID_{1-2}$, $PID_{2-1}$, ..., $PID_{X-1}$. The particulars and purpose of publication identifier(s) will become evident as the discussion progresses.

System 100 also comprises client device(s) $102_1$, $102_2$, ..., $102_W$ (collectively referred to as 102). The client device(s) can include, but are not limited to, personal computers, laptops, tablets, smart phones, and/or personal digital assistants. Each client device is configured to generate a query 120 for information (e.g., a request for an average velocity). The query 120 is sent from the client device to a reporting/analytics node 114 via network 104. The reporting/analytics node 114 then sends a query 120' to the data warehouse 108. Query 120' can comprise query 120 or a reformatted version of query 120.

In response to the query, the data warehouse 108 performs operations to obtain source data of the type specified by the query (e.g., velocity values) and/or process the data to generate query result(s) (e.g., an average velocity value). The manner in which the source data is retrieved from the datastore(s) 112 will become evident as the discussion progresses. However, it should be noted here that the publication identifier(s) are used to retrieve the source data from one or more fact tables.

The query result(s) is(are) then provided to the reporting/analytics node 114. At the reporting/analytics node 114, the format of the query result(s) 126 is(are) converted or otherwise transformed from a first format support by the data warehouse to a second different format supported by the client device(s). The reformatted query results(s) 126' is(are) then provided from the reporting/analytics node 114 to the client device via network 104.

The client device can then perform an assessment of the query result(s) 126'. For example, the client device can analyze the query result(s) to determine whether the safety of the updated version of vehicle software is acceptable. If not, then a remedial measure can be taken such as modifying the vehicle software to address any safety issues or concerns. If so, then the client device can cause the updated vehicle software to be installed on a vehicle 150. The vehicle software is configured to cause the vehicle 150 to perform at least autonomous and semi-autonomous driving operations. The present solution is not limited to the particulars of this example.

Figure 2:
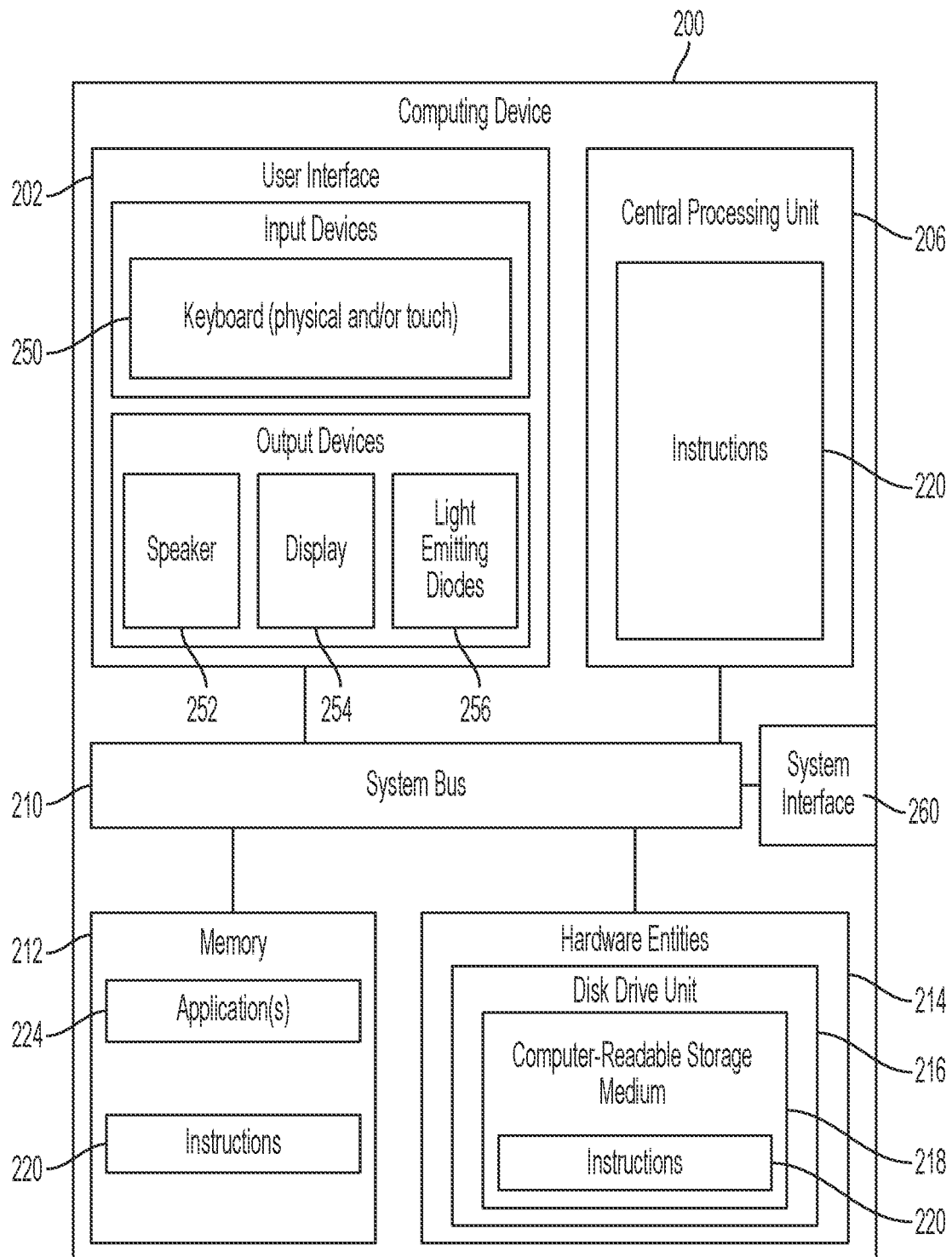
FIG. 2 provides an illustration of an architecture for a computing device.

Referring now to FIG. 2, there is provided an illustration of an illustrative architecture for a computing device 200. The client device(s) 102 of FIG. 1, source device(s) 124 of FIG. 1, load driver node 106 of FIG. 1, load worker node(s) 130 of FIG. 1, server(s) 110 and/or reporting/analytics node 114 of FIG. 1 is/are the same as or similar to computing device 200. As such, the discussion of computing device 200 is sufficient for understanding these devices 102, 106, 110, 114, 124, 130 of FIG. 1.

Computing device 200 may include more or less components than those shown in FIG. 2. However, the components shown are sufficient to disclose an illustrative solution implementing the present solution. The hardware architecture of FIG. 2 represents one implementation of a representative computing device configured to operate a vehicle, as described herein. As such, the computing device 200 of FIG. 2 implements at least a portion of the method(s) described herein.

Some or all components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit (CPU) 206, a system bus 210, a memory 212 connected to and accessible by other portions of computing device 500 through system bus 510, a system interface 260, and hardware entities 214 connected to system bus 210. The user interface can include input devices and output devices, which facilitate user-software interactions for controlling operations of the computing device 200. The input devices include, but are not limited to, a physical and/or touch keyboard 250. The input devices can be connected to the computing device 200 via a wired or wireless connection (e.g., a Bluetooth® connection). The output devices include, but are not limited to, a speaker 252, a display 254, and/or light emitting diodes 256. System interface 260 is configured to facilitate wired or wireless communications to and from external devices (e.g., network nodes such as access points, etc.).

At least some of the hardware entities 214 perform actions involving access to and use of memory 212, which can be a Random Access Memory (RAM), a disk drive, flash memory, a Compact Disc Read Only Memory (CD-ROM) and/or another hardware device that is capable of storing instructions and data. Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies of the present disclosure.

Figure 6:
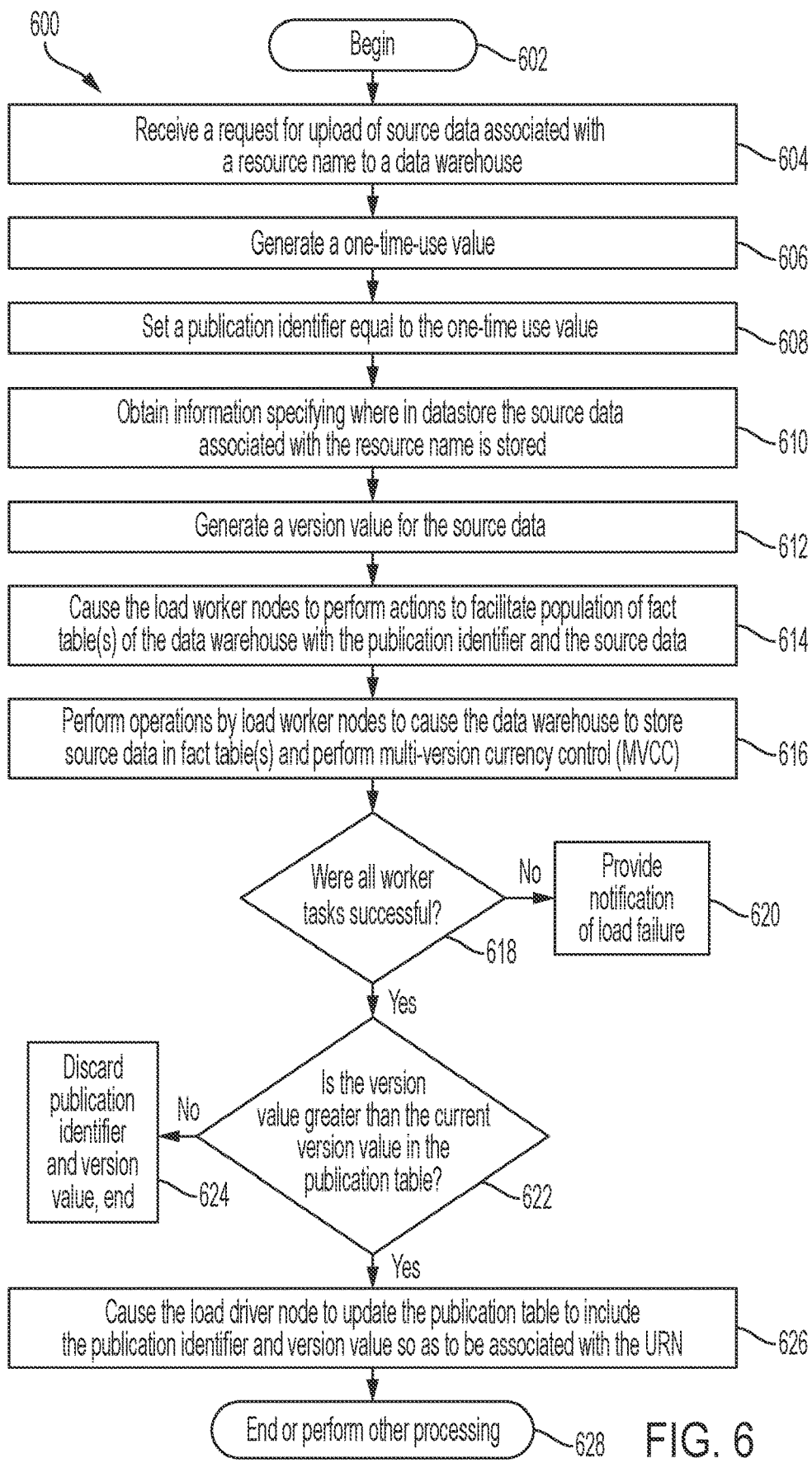
FIG. 6 provides a flow diagram of an illustrative method for uploading source data in a data warehouse.

Referring now to FIG. 6, there is provided an illustration of an illustrative method 600 for uploading source data (e.g., source data 126 of FIGS. 1 and 3) to a data warehouse (e.g., data warehouse 108 of FIG. 1). Method 600 begins with 602 and continues with 604 where a load driver node (e.g., load driver node 106 of FIG. 1) located in a user domain (e.g., user domain 180 of FIG. 1) receives a request from a source device (e.g., source device 124 of FIG. 1) for upload of source data (e.g., source data 126 of FIG. 1) associated with a URN (e.g., URN:simulationABC) to the data warehouse. URNs are well known.

In response to the request, the load driver node generates a one-time-use value in 606. The one-time-use value can be generated, for example, in accordance with a pseudo-random algorithm, a random algorithm, and/or a chaotic algorithm. In 608, a publication identifier is set equal to the one-time use value by the load driver node. The load driver node then performs operations: in 610 to obtain information from the source device that specifies where in a datastore (e.g., datastore 132 of FIG. 1) the source data associated with the URN is stored; and in 612 to generate a version value (e.g., a last modified time of the source data).

Upon completing 612, the load driver node causes load worker node(s) (e.g., load worker node(s) 130 of FIG. 1) to perform actions to populate fact table(s) (e.g., fact table 402 of FIG. 4) of the data warehouse with the publication identifier (e.g., $PID_{1-2}$ of FIG. 4) and the source data (e.g., $Data_{1-2}$, $Data_{1-3}$, $Data_{1-4}$ of FIG. 4). The source data is stored in the fact table(s) so as to be associated with the publication identifier. The load worker node(s) operations cause the data warehouse to (i) store the source data in the fact table(s) and (ii) perform MVCC in the warehouse domain (e.g., warehouse domain 190 of FIG. 1), as shown by 616. MVCC is well known.

Next, the load driver node receives task status information from the load worker node(s). Based on the task status information, the load driver node determines whether all worker tasks for storing the source data in the warehouse were successful. If not [618:NO], then the load driver node decides that a load failure occurred in 620. The load driver may provide a notification of the load failure to a user of the system and/or another device in the system. If so [618:YES], then method 600 continues with 622.

In 622, the load driver node determines whether the version value is greater than a current version value (e.g., version value $VV_{1-N}$ of FIG. 5) in a publication table (e.g., publication table 502 of FIG. 5) of the data warehouse. It should be noted that the publication identifier associated with the greatest version of the source data is stored per URN. The version value for two or more rows in the publication table can be the same or different (e.g., $VV_{1-N}=VV_{2-N}$ or $VV_{1-N}\neq VV_{2-N}$). If the load driver node determines that the version value is not greater than the current version value [622:NO], then the load driver node discards the publication identifier and the version value. Subsequently, the process ends or otherwise terminates as shown by 624. In contrast, if the load driver node determines that the version values is greater than the current version value [622:YES], then the load driver causes the data warehouse to update the publication table to include the publication identifier and version value for the URN. Subsequently, 628 is performed where method 600 ends or other processing is performed (e.g., return to 602).

It should be noted that the source data stored in the data warehouse is made accessible to computing device(s) (e.g., client device(s) 102, reporting/analytics node 114 and/or vehicle 150 of FIG. 1) in a user domain (e.g., user domain 180) of a system (e.g., system 100 of FIG. 1) such that the source data can be retrieved, analyzed and/or used to control operations of a vehicle (e.g., vehicle 150 of FIG. 1). For example, the source data can be analyzed to determine whether new or updated software for controlling an autonomous vehicle has a given level of safety (e.g., based on a number of and/or type of faults experienced during simulation of vehicle operations using the control software). Techniques for determining whether vehicle control software has a given level of safety are well known. If so, then the control software is deployed in the autonomous vehicle. The control software may be configured to autonomous driving operations such as object detection, object classification, object trajectory generation, and vehicle trajectory generation. Each of the listed operations is well known.

Figure 7:
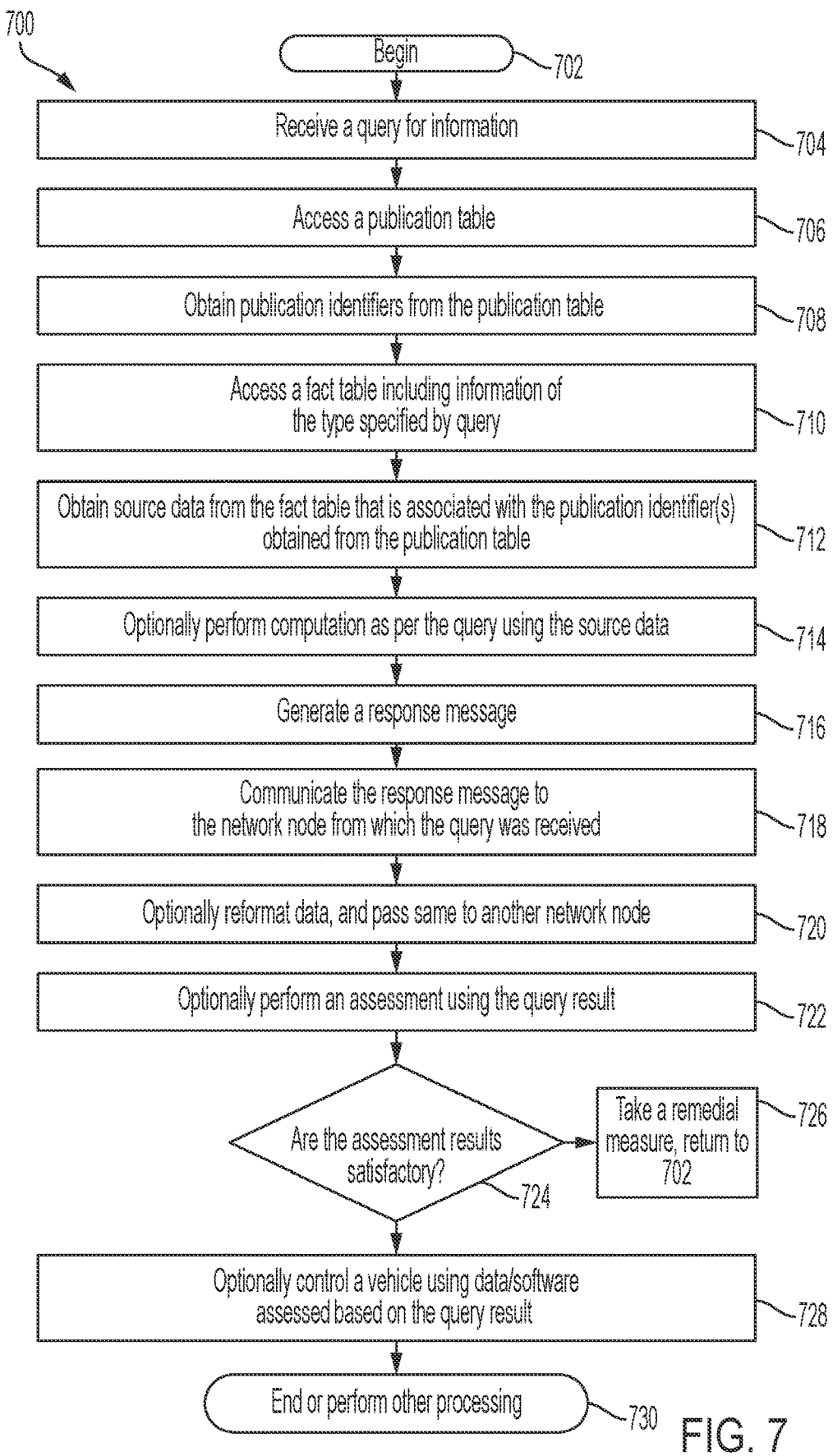
FIG. 7 provides a flow diagram of accessing and using source data stored in a data warehouse.

Referring now to FIG. 7, there is provided a flow diagram of an illustrative method 700 for accessing source data (e.g., source data 126 of FIG. 1) stored in a data warehouse (e.g., data warehouse 108 of FIG. 1). Method 700 begins with 702 and continues with 704 where a data warehouse receives a query (e.g., query 120 or 120' of FIG. 1) for information (e.g., an average velocity value and/or an average acceleration value). The query can include URN(s) or be absent of any URN. The query can request information contained in one or more fact tables of the data warehouse. Significant advantages are achieved when the information is directed to a plurality of fact tables. These advantages include, but are not limited to, improved atomicity and improved data integrity (as compared to conventional systems that only employ MVCC during each single-table operation within the warehouse domain).

In response to the request, the data warehouse accesses the publication table (e.g., publication table 502 of FIG. 5) and obtains publication identifiers (e.g., $PID_{1-N}$, $PID_{2-N}$, . . . of FIG. 5) therefrom, as shown by 706, 708. When the query includes URN(s), the URN(s) is(are) used to identify which publication identifier(s) are to be obtained from the publication table. Thus, the publication table provides a means to transform or otherwise convert URNs to publication identifier(s) for accessing source data of interest in the warehouse domain (or vice versa). When the query does not include any URN(s), then all the publication identifiers in the publication table are obtained in 708.

The data warehouse then accesses the fact table(s) (e.g., fact table 402 of FIG. 4) that include(s) information of the type (e.g., velocity values and/or acceleration values) specified by the query, as shown by 710. In 712, the data warehouse obtains source data from the fact table(s) that is associated with the publication identifier(s) obtained from the publication table, i.e., source data can be identified and retrieved from fact table(s) using publication identifier(s). For example, with reference to FIG. 4, the publication identifiers obtained from the publication table include $PID_{1-2}$ and $PID_{2-1}$. Thus, two sets of source data are retrieved from the fact table 402. The first set includes the following source data associated with $PID_{1-2}$: $Data_{1-2}$, $Data_{1-3}$, $Data_{1-4}$. The second set includes the following source data associated with $PID_{2-1}$: $Data_{2-1}$, $Data_{2-2}$, $Data_{2-3}$. It should be noted that the source data associated with $PID_{1-1}$ and $PID_{X-1}$ were not retrieved since these publication identifiers were not obtained from the publication table. The present solution is not limited to the particulars of this example.

Referring back to FIG. 7, method 700 continues with 714 where the data warehouse optionally performs computations as per the query using the source data obtained in 712 (e.g., computes an average velocity and/or an average acceleration). In 716, the data warehouse generates a response message including the source data and/or results of the computations performed in 714. The response message is communicated in 718 from the data warehouse to the network node (e.g., client device 102₁ or reporting/analytics node 114 of FIG. 1) from which the query was received. Thereafter, the data of the response message is optionally reformatted at the network node (e.g., reporting/analytics node 114 of FIG. 1) and/or passed to another network node (e.g., client device 102₁ of FIG. 1).

The network node may perform an assessment using the data as shown by 722. For example, the network node may analyze the data (e.g., velocity values and/or average velocity values) to determine whether the safety of a new or updated version of vehicle software is acceptable. Techniques for determining a safety level or status of vehicle software are well known and selected based on given application particulars. The present solution is not limited to the particulars of this example. If the assessment results are not satisfactory (e.g., the safety of the new or updated version of vehicle software is not acceptable) [724:NO], then a remedial measure may be taken (e.g., the vehicle software is updated to cure the safety issue(s)). Method 700 then returns to 702.

In contrast, if the assessment results are satisfactory (e.g., the safety of the new or updated version of vehicle software is acceptable) [724:YES], then 728 may optionally be performed. 728 involves controlling a vehicle (e.g., vehicle 150 of FIG. 1) using data/software assessed based on the query result. Subsequently, 730 is performed where method 700 ends or other operations are performed (e.g., return to 702).

Figure 8:
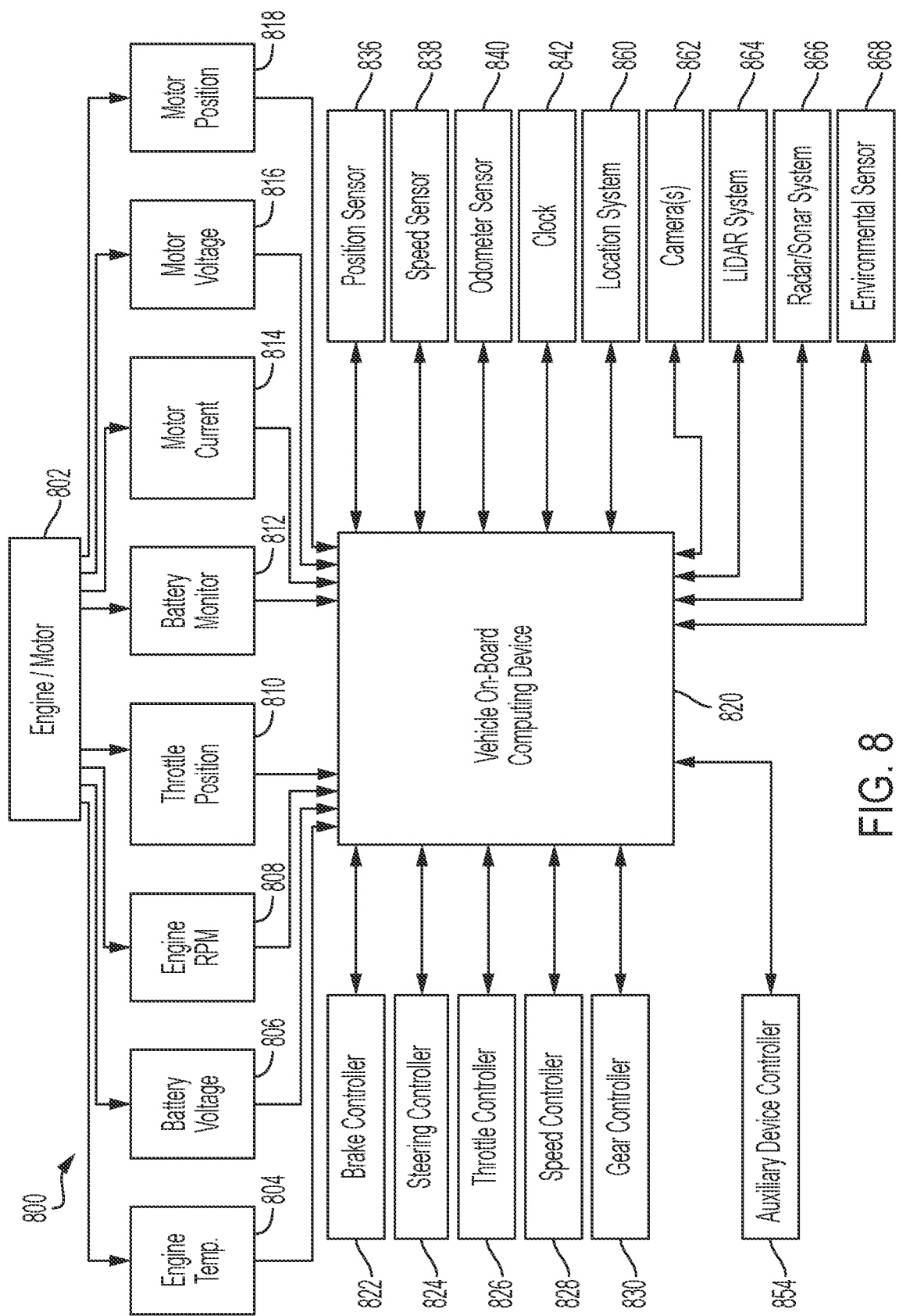
FIG. 8 provides an illustration of an illustrative architecture for a vehicle.

Referring now to FIG. 8, there is provided an illustration of an illustrative system architecture 800 for a vehicle. Vehicle 150 of FIG. 1 can have the same or similar system architecture as that shown in FIG. 8. Thus, the following discussion of system architecture 800 is sufficient for understanding vehicle 150 of FIG. 1.

As shown in FIG. 8, the vehicle 800 includes an engine or motor 802 and various sensors 804-818 for measuring various parameters of the vehicle. In gas-powered or hybrid vehicles having a fuel-powered engine, the sensors may include, for example, an engine temperature sensor 804, a battery voltage sensor 806, an engine Rotations Per Minute (RPM) sensor 808, and a throttle position sensor 810. If the vehicle is an electric or hybrid vehicle, then the vehicle may have an electric motor, and accordingly will have sensors such as a battery monitoring system 812 (to measure current, voltage and/or temperature of the battery), motor current 814 and voltage 816 sensors, and motor position sensors such as resolvers and encoders 818.

Operational parameter sensors that are common to both types of vehicles include, for example, a position sensor 836 such as an accelerometer, gyroscope and/or inertial measurement unit, a speed sensor 838, and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also will include various sensors that operate to gather information about the environment in which the vehicle is traveling. These sensors may include, for example, a location sensor 860 (e.g., a Global Positioning System (GPS) device), object detection sensors (e.g., camera(s) 862), a LiDAR system 864, and/or a radar/sonar system 866. The sensors also may include environmental sensors 868 such as a precipitation sensor and/or ambient temperature sensor. The object detection sensors may enable the vehicle to detect objects that are within a given distance range of the vehicle 800 in any direction, while the environmental sensors collect data about environmental conditions within the vehicle's area of travel.

During operations, information is communicated from the sensors to an on-board computing device 820. The on-board computing device 820 analyzes the data captured by the sensors and optionally controls operations of the vehicle based on results of the analysis. For example, the on-board computing device 820 may control: braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers.

Geographic location information may be communicated from the location sensor 860 to the on-board computing device 820, which may then access a map of the environment that corresponds to the location information to determine known fixed features of the environment such as streets, buildings, stop signs and/or stop/go signals. Captured images from the cameras 862 and/or object detection information captured from sensors (e.g., LiDAR system 864) is communicated to the on-board computing device 820. The object detection information and/or captured images are processed by the on-board computing device 820 to detect objects in proximity to the vehicle 800. The object detections are made in accordance with any known or to be known object detection technique.

When the on-board computing device 820 detects a moving object, the on-board computing device 820 will generate one or more possible object trajectories for the detected object, and analyze the possible object trajectories to assess the risk of a collision between the object and the vehicle if the AV was to follow a given vehicle trajectory. If there is not a risk of collision, then the AV is caused to follow the given vehicle trajectory. If there is a risk of collision, then an alternative vehicle trajectory can be generated and/or the AV can be caused to perform a certain maneuver (e.g., brake, accelerate and/or change direction of travel). The vehicle trajectories are generated using a high definition map (e.g., a road/terrain map).

Figure 9:
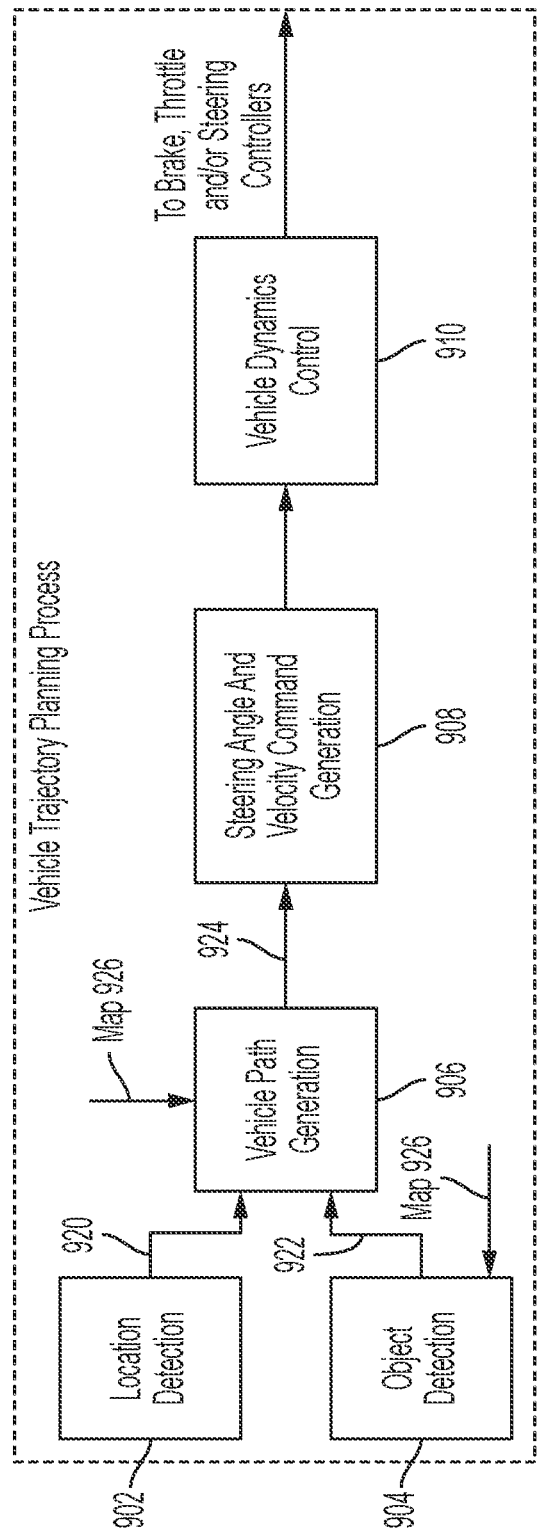
FIG. 9 provides an illustration of an illustration process for controlling or otherwise operating an vehicle.

A block diagram is provided in FIG. 9 that is useful for understanding how vehicle control is achieved. The operations of FIG. 9 can be performed in 728 of FIG. 7. All or some of the operations performed in FIG. 9 can be performed by the on-board computing device (e.g., on-board computing device 720 of FIG. 7) of a vehicle (e.g., vehicle 150 of FIG. 1 and/or vehicle 800 of FIG. 8) and/or a remote computing device (e.g., computing device 310 of FIG. 3) using vehicle software and/or other data (e.g., source data, query results, assessment results, etc.).

In block 902, a location of the vehicle is detected. This detection can be made based on sensor data output from a location sensor (e.g., location sensor 860 of FIG. 8) of the vehicle. This sensor data can include, but is not limited to, GPS data. Information 820 specifying the detected location of the vehicle is then passed to block 906.

In block 904, an object is detected within proximity of the vehicle. This detection is made based on sensor data output from a camera (e.g., camera 862 of FIG. 8) of the vehicle. Any known or to be known object detection technique can be used here. Information about the detected object 922 is passed to block 906. This information includes, but is not limited to a position of an object, an orientation of the object, a spatial extent of the object, an initial predicted trajectory of the object, a speed of the object, and/or a classification of the object. The initial predicted object trajectory can include, but is not limited to, a linear path pointing in the heading direction of the object. The initial predicted trajectory of the object can be generated using a high definition map 926 (or final 3D point cloud).

In block 906, a vehicle trajectory is generated using the information from blocks 902 and 904, as well as the high definition map 926. Techniques for determining a vehicle trajectory are well known in the art. Any known or to be known technique for determining a vehicle trajectory can be used herein. For example, in some scenarios, such a technique involves determining a trajectory for the vehicle that would pass the object when the object is in front of the vehicle, the object has a heading direction that is aligned with the direction in which the AV is moving, and the object has a length that is greater than a threshold value. The present solution is not limited to the particulars of this scenario. The vehicle trajectory 924 can be determined based on the location information 920, the object detection information 922, and/or the high definition map 926 which is stored in a datastore of the vehicle. The vehicle trajectory 924 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 924 is then provided to block 908.

In block 908, a steering angle and velocity command is generated based on the vehicle trajectory 924. The steering angle and velocity command is provided to block 910 for vehicle dynamics control. Vehicle dynamics control is well known. The vehicle dynamics control cause the vehicle to follow the vehicle trajectory 924.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for retrieving and using data stored in a data warehouse, comprising:
   receiving, at a computing device, a query for information directed to a plurality of fact tables, wherein each said fact table comprises sets of source data that are arranged so as to be respectively associated with a plurality of first publication identifiers, and the source data is associated with one or more unique resource names that are different than the plurality of first publication identifiers;
   obtaining, by the computing device, second publication identifiers from a publication table in response to the query, wherein the publication table is separate from the plurality of fact tables and the second publication identifiers are arranged in the publication table so as to be respectively associated with the unique resource names and version values, wherein each said version value references a version of at least a portion of the source data at a respective last modified time; and
   obtaining, by the computing device, at least one of the sets of source data from each said fact table of the plurality of fact tables that is associated with a first publication identifier of the plurality of first publication identifiers which matches one of the second publication identifiers.

2. The method according to claim 1, further comprising performing a computation as per the query using the source data.

3. The method according to claim 1, further comprising communicating, to an external device from which the query was received, a query result comprising at least one of (i) the sets of source data obtained from said fact tables and (ii) results from processing the sets of source data obtained from said fact tables.

4. The method according to claim 3, further comprising performing, by the external device or another external device, an assessment of given data or software using the query result.

5. The method according to claim 4, further comprising updating the given data or software to address issues identified during the assessment.

6. The method according to claim 4, further comprising using the given data or software to control an autonomous or semi-autonomous vehicle based on results of assessment.

7. The method according to claim 1, further comprising updating the publication table to include the second publication identifiers and version values so as to be associated with the one or more unique resource names.

8. The method according to claim 7, further comprising determining whether each said version value is greater than a current version value for the respective source data that is stored in the publication table.

9. The method according to claim 8, wherein the publication table is updated to include the version value when a determination is made that the version value is greater than the current version value.

10. A system, comprising:
    a processor;
    a non-transitory computer-readable storage medium comprising programming instructions that are configured to cause the processor to implement a method for retrieving and using data, wherein the programming instructions comprise instructions to:
    receive a query for information directed to a plurality of fact tables, wherein each said fact table comprises sets of source data that are arranged so as to be respectively associated with a plurality of first publication identifiers, and the source data is associated with one or more unique resource names that are different than the plurality of first publication identifiers;
    obtain second publication identifiers from a publication table in response to the query, wherein the publication table is separate from the plurality of fact tables and the second publication identifiers are arranged in the publication table so as to be respectively associated with the unique resource names and version values, each said version value referencing a version of at least a portion of the source data at a respective last modified time; and
    obtain at least one of the sets of source data from each said fact table of the plurality of fact tables that is associated with a first publication identifier of the plurality of first publication identifiers which matches one of the second publication identifiers.

11. The system according to claim 10, wherein the programming instructions further comprise instructions to perform a computation as per the query using the source data.

12. The system according to claim 10, wherein the programming instructions further comprise instructions to communicate, to an external device from which the query was received, a query result comprising at least one of (i) the sets of source data obtained from said fact tables and (ii) results from processing the sets of source data obtained from said fact tables.

13. The system according to claim 12, wherein the programming instructions further comprise instructions to perform an assessment of given data or software using the query result.

14. The system according to claim 13, wherein the programming instructions further comprise instructions to update the given data or software to address issues identified during the assessment.

15. The system according to claim 13, wherein the programming instructions further comprise instructions to use the given data or software to control an autonomous or semi-autonomous vehicle based on results of assessment.

16. The system according to claim 10, wherein the programming instructions further comprise instructions to update the publication table to include the second publication identifiers and version values so as to be associated with the one or more unique resource names.

17. The system according to claim 16, wherein the programming instructions further comprise instructions to determine whether each said version value is greater than a current version value for the respective source data that is stored in the publication table.

18. The system according to claim 17, wherein the publication table is updated to include the version value when a determination is made that the version value is greater than the current version value.

19. A non-transitory computer-readable medium that stores instructions that, when executed by at least one computing device, will cause the at least one computing device to perform operations comprising:
receiving a query for information directed to a plurality of fact tables stored in a data warehouse, wherein each said fact table comprises sets of source data that are arranged so as to be respectively associated with a plurality of first publication identifiers, the source data is associated with one or more unique resource names that are different than the plurality of first publication identifiers;
obtaining, by the computing device, second publication identifiers from a publication table in response to the query, wherein the publication table is separate from the plurality of fact tables and the second publication identifiers are arranged in the publication table so as to be respectively associated with the unique resource names and version values, each said version value referencing a version of at least a portion of the source data at a respective last modified time; and
obtaining, by the computing device, at least one of the sets of source data from each said fact table of the plurality of fact tables that is associated with a first publication identifier of the plurality of first publication identifiers which matches one of the second publication identifiers.

* * * * *